(12) United States Patent
Gosavi et al.

(10) Patent No.: US 9,309,153 B2
(45) Date of Patent: Apr. 12, 2016

(54) WIDE TEMPERATURE RANGE CEMENT RETARDER

(75) Inventors: Tushar Sureshgiri Gosavi, Pune (IN); Ramesh Muthusamy, Pune (IN); Rahul Chandrakant Patil, Pune (IN); Sandip Prabhakar Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 899 days.

(21) Appl. No.: 13/458,718

(22) Filed: Apr. 27, 2012

(65) Prior Publication Data

US 2013/0284439 A1 Oct. 31, 2013

(51) Int. Cl.
*C04B 28/02* (2006.01)
*C09K 8/467* (2006.01)

(52) U.S. Cl.
CPC ............... *C04B 28/02* (2013.01); *C09K 8/467* (2013.01)

(58) Field of Classification Search
None
See application file for complete search history.

(56) References Cited

U.S. PATENT DOCUMENTS

| | | |
|---|---|---|
| 4,500,356 A | 2/1985 | Crump et al. |
| 4,515,635 A | 5/1985 | Rao et al. |
| 4,640,942 A | 2/1987 | Brothers |
| 4,676,317 A | 6/1987 | Fry et al. |
| 4,676,832 A | 6/1987 | Childs et al. |
| 4,700,780 A | 10/1987 | Brothers |

(Continued)

FOREIGN PATENT DOCUMENTS

| | | |
|---|---|---|
| CA | 1258366 | 8/1989 |
| CA | 1258366 A | 8/1989 |

OTHER PUBLICATIONS

Cream, S.C., "New Fluid-Loss Additives for Oilfield Cementing," SPE 18901, Mar. 13-14, 1989.

(Continued)

*Primary Examiner* — Angela M DiTrani
(74) *Attorney, Agent, or Firm* — Craig W. Roddy; Baker Botts L.L.P.

(57) ABSTRACT

According to an embodiment, a composition that can be used in cementing. The composition includes at least:
(i) a hydraulic cement;
(ii) a copolymer comprising at least the monomeric units (a) through (d) of the following formula:

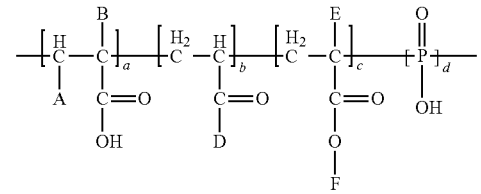

(a) A = H, B = H, $CH_3$ (or) A = COOH, B = H, $CH_3$
(b) D = ——NH——$C(CH_3)_2$——$CH_2$——$SO_3M$
   Where M = Na, K
(c) E = H, $CH_3$ F = ——$(CH_2)_2$——OH,
   ——$CH_2$——$CH(CH_3)$——OH wherein the monomeric units (a) through (d) can be any sequence and any proportion in the copolymer. With water, the composition of the hydraulic cement and such a copolymer becomes a cement composition. According to the method, the cement composition is introduced into a well and allowed to set in the well.

12 Claims, 1 Drawing Sheet

Effect of copolymer (retarder) concentration on thickening time at 217 °F

(56) References Cited

U.S. PATENT DOCUMENTS

| | | |
|---|---|---|
| 4,703,801 A | 11/1987 | Fry et al. |
| 5,049,288 A | 9/1991 | Brothers et al. |
| 5,077,361 A | 12/1991 | Hughes et al. |
| 5,263,542 A | 11/1993 | Brothers |
| 5,292,367 A | 3/1994 | Bloys et al. |
| 5,340,397 A | 8/1994 | Brothers |
| 5,355,955 A | 10/1994 | Rodrigues et al. |
| 5,368,642 A | 11/1994 | Rodrigues et al. |
| 5,398,759 A | 3/1995 | Rodrigues et al. |
| 5,421,881 A | 6/1995 | Rodrigues et al. |
| 5,427,617 A | 6/1995 | Bobrowski et al. |
| 5,472,051 A | 12/1995 | Brothers |
| 5,484,478 A | 1/1996 | Brothers |
| 5,536,311 A | 7/1996 | Rodrigues |
| 5,672,203 A | 9/1997 | Chatterji et al. |
| 5,855,244 A | 1/1999 | Ahmed et al. |
| 5,871,577 A | 2/1999 | Chatterji et al. |
| 5,932,344 A | 8/1999 | Ikemoto et al. |
| 6,076,997 A | 6/2000 | First et al. |
| 6,419,016 B1 | 7/2002 | Reddy |
| 6,626,992 B2 | 9/2003 | Vijn et al. |
| 6,708,760 B1 | 3/2004 | Chatterji et al. |
| 6,715,552 B2 | 4/2004 | Eoff et al. |
| 6,730,636 B2 | 5/2004 | Vijn et al. |
| 6,767,867 B2 | 7/2004 | Chatterji et al. |
| 6,818,057 B2 | 11/2004 | Hanley et al. |
| 6,840,319 B1 | 1/2005 | Chatterji et al. |
| 6,855,201 B2 | 2/2005 | Eoff et al. |
| 6,978,835 B1 | 12/2005 | Reddy et al. |
| 7,008,479 B2 | 3/2006 | Chatterji et al. |
| 7,021,380 B2 | 4/2006 | Caveny et al. |
| 7,044,170 B2 | 5/2006 | Goodwin |
| 7,063,153 B2 | 6/2006 | Eoff et al. |
| 7,073,585 B2 | 7/2006 | Morgan et al. |
| 7,087,556 B2 | 8/2006 | Chen et al. |
| 7,244,303 B2 | 7/2007 | Chatterji et al. |
| 7,285,165 B2 | 10/2007 | Caveny et al. |
| 7,350,574 B2 | 4/2008 | Santra et al. |
| 7,384,893 B2 | 6/2008 | Morgan et al. |
| 7,384,894 B2 | 6/2008 | Morgan et al. |
| 7,388,045 B1 | 6/2008 | Lewis et al. |
| 7,404,440 B2 | 7/2008 | Reddy et al. |
| 7,478,675 B2 | 1/2009 | Roddy et al. |
| 7,523,784 B2 | 4/2009 | Lewis et al. |
| 7,537,656 B2 | 5/2009 | Santra et al. |
| 7,576,040 B2 | 8/2009 | Lewis et al. |
| 7,674,332 B2 | 3/2010 | Roddy et al. |
| 7,678,190 B2 * | 3/2010 | Michaux et al. ............... 106/696 |
| 7,842,652 B2 | 11/2010 | Lewis et al. |
| 2003/0144384 A1 | 7/2003 | Chen et al. |
| 2006/0081155 A1 | 4/2006 | Chatterji et al. |
| 2006/0288910 A1 | 12/2006 | Santra et al. |
| 2006/0289162 A1 | 12/2006 | Santra et al. |
| 2007/0125278 A1 | 6/2007 | Caveny et al. |
| 2008/0115938 A1 | 5/2008 | Bray |
| 2008/0236451 A1 | 10/2008 | Reddy et al. |
| 2010/0111809 A1 | 5/2010 | Suau et al. |
| 2010/0139523 A1 | 6/2010 | Gray |
| 2011/0046025 A1 | 2/2011 | Rodrigues |

OTHER PUBLICATIONS

International Search Report, International Application No. PCT/US2013/036174, Date of mailing Jul. 3, 2013.

International Preliminary Report on Patentability issued in related PCT Application No. PCT/US2013/036174 mailed Oct. 28, 2014, 5 pages.

* cited by examiner

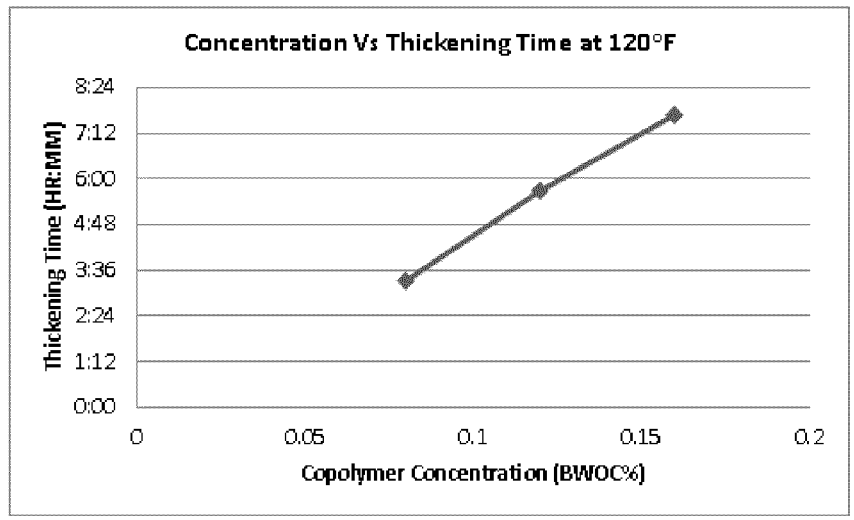
Figure 1. Effect of copolymer (retarder) concentration on thickening time at 120 °F
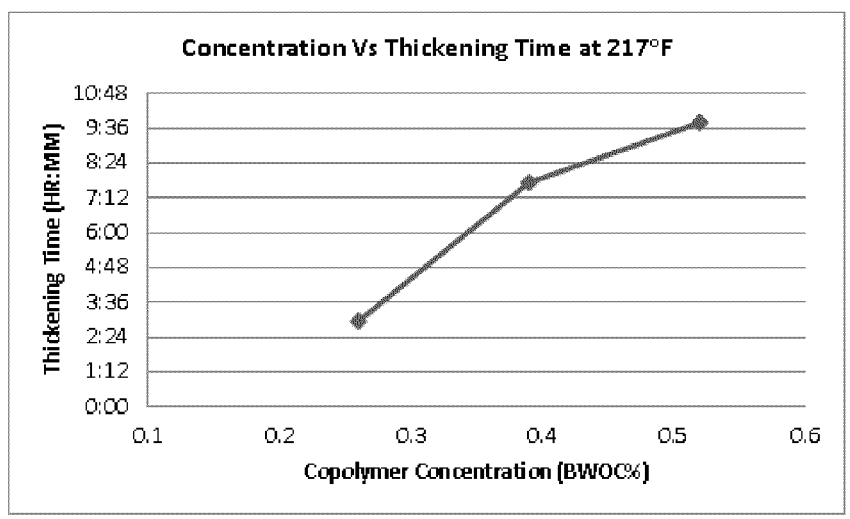
Figure 2. Effect of copolymer (retarder) concentration on thickening time at 217 °F

WIDE TEMPERATURE RANGE CEMENT RETARDER

CROSS-REFERENCE TO RELATED APPLICATIONS

Not applicable.

TECHNICAL FIELD

The inventions are in the field of producing crude oil or natural gas from subterranean formations. More specifically, the inventions generally relate to cementing in oil or gas wells.

BACKGROUND ART

In the context of production from a well, oil and gas are understood to refer to crude oil and natural gas. Oil and gas are naturally occurring hydrocarbons in certain subterranean formations.

A subterranean formation is a body of rock that has sufficiently distinctive characteristics and is sufficiently continuous for geologists to describe, map, and name it. A subterranean formation having a sufficient porosity and permeability to store and transmit fluids is sometimes referred to as a reservoir. A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

To produce oil or gas, a well is drilled into a subterranean formation that is an oil or gas reservoir. A well includes a wellhead and at least one wellbore from the wellhead penetrating the earth.

Typically, a wellbore must be drilled hundreds or thousands of feet into the earth to reach an oil or gas bearing formation. Generally, the greater the depth of the formation the higher the static temperature and pressure of the formation.

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation.

In general, drilling is the process of drilling the wellbore. After the hole is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, cement compositions can be used in cementing operations in which a string of pipe, such as casing or liner, is cemented in a wellbore. After setting, the cement stabilizes the pipe in the wellbore and prevents undesirable migration of fluids along the annulus between the wellbore and the outside of the casing or liner between various zones of subterranean formations penetrated by the wellbore. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore, for example, by using downhole tools such as packers or plugs, or by using other techniques, such as forming sand plugs or placing cement in the perforations. Cement compositions can also be utilized in intervention operations, such as in plugging highly permeable zones or fractures in zones that may be producing too much water, plugging cracks or holes in pipe strings, and the like.

After drilling and cementing the casing, completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well. Workover can broadly refer to any kind of well intervention that involves invasive techniques, such as wireline, coiled tubing, or snubbing. More specifically, though, workover refers to the process of pulling and replacing a completion.

A well service usually involves introducing a well fluid into a well. As used herein, a "well fluid" is a fluid used in a well service. As used herein, a "well fluid" broadly refers to any fluid adapted to be introduced into a well for any purpose. A well fluid can be, for example, a drilling fluid, a cement composition, a treatment fluid, or a spacer fluid. If a well fluid is to be used in a relatively small volume, for example less than about 200 barrels (32 m$^3$), it is sometimes referred to in the art as a wash, dump, slug, or pill.

Hydraulic cement is a material that when mixed with water hardens or sets over time because of a chemical reaction with the water. The cement composition sets by a hydration process, and it passes through a gel phase to solid phase. Because this is a chemical reaction with the water, hydraulic cement is capable of setting even under water. The hydraulic cement, water, and any other components are mixed to form a cement composition in the initial state of slurry, which should be a fluid for a sufficient time before setting for pumping the composition into the wellbore and for placement in a desired downhole location in the well.

In performing cementing, a cement composition is pumped as a fluid (typically in the form of suspension or slurry) into a desired location in the wellbore. For example, in cementing a casing or liner, the cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and fills the annular space between the exterior surfaces of the pipe string and the borehole of the wellbore.

It is important to maintain a cement in a pumpable slurry state until it placed in a desired portion of the well. For this purpose, a cement retarder, which is sometimes referred to as a set retarder or simply a retarder, can be used in a cement composition. A retarder retards the setting process and helps provide adequate pumping time to place the cement slurry.

Without being limited by any theory, it is believed a retarder works by one or more of the principles of chelation, adsorption, or precipitation.

In general, the selection of a cement retarder depends upon the well temperature. In addition, different thickening time can be achieved at particular temperature by varying the concentration of the retarder in the cement composition. Some of the known retarders work at a low temperature range while others work at high temperature range.

Phosphonate retarders are known to work at high temperature (450° F. to 550° F.) as described in CA1258366. Borates (e.g., sodium pentaborate and potassium pentaborate) and organic acids (e.g., citric acid and tartaric acid) are used as retarder or intensifier for high temperature. Similarly, polymeric retarder containing phosphate groups has been described in GB2443923 to work at temperature 300° F. to 600° F. These retarders are not desirable for low temperature application, however, because they are too sensitive to concentration. A slight inadvertent change in concentration during field operation may adversely affect the thickening time. It is desirable to have a retarder which performs well at low as well as high temperature, including by not being too sensitive to concentration at the design temperature.

It would be desirable to have a single polymer that could be used to help control the thickening time of a cement composition over a wide range of temperatures and without being too sensitive to concentration in the cement composition over the wide range of temperatures.

SUMMARY OF THE INVENTION

According to an embodiment, a composition is provided that can be used in cementing. The composition includes at least:

(i) a hydraulic cement; and
(ii) a copolymer comprising at least the monomeric units (a) through (d) of the following formula:

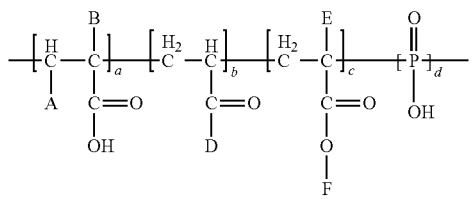

(a) A = H, B = H, CH$_3$ (or) A = COOH, B = H, CH$_3$
(b) D = —NH—C(CH$_3$)$_2$—CH$_2$—SO$_3$M
   Where M = Na, K
(c) E = H, CH$_3$ F = —(CH$_2$)$_2$—OH,
   —CH$_2$—CH(CH$_3$)—OH wherein the monomeric units (a) through (d) can be any sequence and any proportion in the copolymer. With water, the composition of the hydraulic cement and such a copolymer becomes a cement composition.

According to another embodiment of the invention, a method of cementing in a well is provided. The method includes the steps of:

(A) introducing a cement composition into the well, the cement composition comprising:
   (i) a hydraulic cement;
   (ii) a copolymer comprising at least the monomeric units
      (a) through (d) of the following formula:

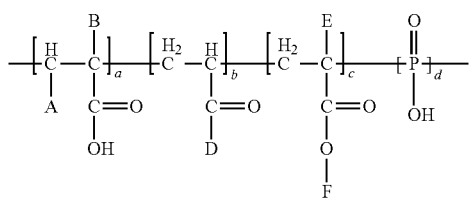

(a) A = H, B = H, CH$_3$ (or) A = COOH, B = H, CH$_3$
(b) D = —NH—C(CH$_3$)$_2$—CH$_2$—SO$_3$M
   Where M = Na, K
(c) E = H, CH$_3$ F = —(CH$_2$)$_2$—OH,
   —CH$_2$—CH(CH$_3$)—OH wherein the monomeric units (a) through (d) can be any sequence and any proportion in the copolymer; and
   (iii) water; and
(B) allowing the cement composition to set in the well.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

FIG. 1 is a graph showing the effect of the copolymer concentration on thickening time at 120° F.

FIG. 2 is a graph showing the effect of the copolymer concentration on thickening time at 217° F.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

Patent Terms

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. are assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Well Terms

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A "well" includes a wellhead and at least one wellbore from the wellhead penetrating the earth. The "wellhead" is the surface termination of a wellbore, which surface may be on land or on a seabed. A "well site" or "job site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introduced at least into and through the wellhead. According to various techniques known in the art, tubulars, equipment, tools, or well fluids can be directed from the wellhead into any desired portion of the wellbore. Additionally, a well fluid can be directed from a portion of the wellbore into the rock matrix of a zone.

As used herein, the word "tubular" means any kind of pipe. Examples of tubulars include, but are not limited to, a drill pipe, a casing, a tubing string, a line pipe, and a transportation pipe. Tubulars can also be used to transport fluids into or out of a subterranean formation, such as oil, gas, water, liquefied methane, coolants, and heated fluids. For example, a tubular can be placed underground to transport produced hydrocarbons or water from a subterranean formation to another location.

As used herein, the term "annulus" means the space between two generally cylindrical objects, one inside the other, where fluid can flow. The objects can be concentric or eccentric. One of the objects can be a tubular and the other object can be an enclosed conduit. The enclosed conduit can be a wellbore or borehole or it can be another tubular. The following examples illustrate some situations in which an annulus can exist, but are in no way limiting as to all the situations in which an annulus can exist. Referring to an oil, gas, or water well, in an open hole well, the space between the wellbore and the outside of a tubing string is an annulus. In a cased hole, the space between the wellbore and the outside of the casing is an annulus. Also, in a cased hole, there may be an annulus between the tubing string and the inside of the casing.

As used herein, a "well fluid" broadly refers to any fluid adapted to be introduced into a well for any purpose. A well fluid can be, for example, a drilling fluid, a cement composition, a treatment fluid, or a spacer fluid. If a well fluid is to be used in a relatively small volume, for example less than about 200 barrels (about 32 m$^3$), it is sometimes referred to in the art as a wash, dump, slug, or pill.

Broadly, a zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore.

The term "design temperature" refers to an estimate or measurement of the actual temperature at the down hole environment at the time of a well treatment. That is, design temperature takes into account not only the bottom hole static temperature ("BHST"), but also the effect of the temperature of the well fluid on the BHST during treatment, which is the bottom hole circulation temperature ("BHCT"). Because treatment fluids may be considerably cooler than BHST, the difference between the two temperatures can be quite large. Ultimately, if left undisturbed, a subterranean formation will return to the BHST.

Fluid Terms

The physical state or phase of a substance (or mixture of substances) and other physical properties are determined at a temperature of 77° F. (25° C.) and a pressure of 1 atmosphere (Standard Laboratory Conditions) without any applied shear.

As used herein, a fluid is a substance that behaves as a fluid under Standard Laboratory Conditions.

Every fluid inherently has at least a continuous phase. A fluid can have more than one phase. The continuous phase of a well fluid is a liquid under standard laboratory conditions. For example, a well fluid can in the form of be a suspension (solid particles dispersed in a liquid phase), an emulsion (liquid particles dispersed in another liquid phase), or a foam (a gas phase dispersed in liquid phase).

Unless otherwise specified, the apparent viscosity of a fluid (excluding any suspended solid particulate larger than silt) is measured with a Fann Model 50 type viscometer using an R1 rotor, B1 bob, and F1 torsion spring at a shear rate of 40 l/s, and at a temperature of 77° F. (25° C.) and a pressure of 1 atmosphere. For reference, the viscosity of pure water is about 1 cP.

Cement Compositions

As used herein, a "cement composition" is a mixture of at least hydraulic cement and water. The cement composition can also include additives.

As used herein, the term "cement" means a dry particulate (e.g., powder) substance that acts as a binder to bind other materials together. A "hydraulic cement" (e.g., Portland cement) hardens because of hydration, chemical reactions. As used herein, "cement" means hydraulic cement unless otherwise specified.

During well completion, it is common to introduce a cement composition into an annulus in the wellbore. For example, in a cased hole, the cement composition is placed into and allowed to set in the annulus between the wellbore and the casing in order to stabilize and secure the casing in the wellbore. After setting, the set cement composition should have a low permeability. Consequently, oil or gas can be produced in a controlled manner by directing the flow of oil or gas through the casing and into the wellhead. Cement compositions can also be used in well-plugging operations or gravel-packing operations.

During cementing operations, it is necessary for the cement composition to remain pumpable during introduction into the subterranean formation or the well and until the cement composition is situated in the portion of the subterranean formation or the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the cement composition to set.

As used herein, a "retarder" is a chemical agent used to increase the thickening time of a hydraulic cement composition. The thickening time required for a cement composition tends to increase with depth of the zone to be cemented due to the greater time required to complete the cementing operation and the effect of increased temperature on the thickening time of the cement. A longer thickening time at the design temperature allows for a longer pumping time that may be required.

Hydraulic Cement and Cementitious Materials

A hydraulic cement hardens by reaction with water. A hydraulic cement can be used to make cementitious materials that can thicken and set when mixed with water. Cementitious materials include, but are not limited to, Portland cements (e.g., classes A, B, C, G, and H Portland cements), pozzolanic cements, gypsum cements, phosphate cements, high alumina content cements, silica cements, shale cements, acid/base cements, magnesia cements such as Sorel cements, zeolite cement systems, cement kiln dust cement systems, slag cements, micro-fine cement, metakaolin, and combinations thereof.

Copolymer as Retarder

The present invention discloses a type of polymer that works as a cement retarder over a wide range of temperatures and without being too sensitive to concentration in the cement composition over the wide range of temperatures. According to the invention, the polymer has both carboxylic and phosphinic acid functional groups. Without being limited by any theory, it is believed that a polymer having both such functional groups provides the necessary retarder function over a wide range of temperatures without excessive sensitivity to concentration.

A retarder according to the invention is a copolymer including at least the functional groups of carboxylic acid, sulfonic acid or sulfonic acid salt, hydroxyl, and phosphinic acid. A structure of the polymer can be generally represented by the following chemical formula including at least the monomeric units (a) through (d), wherein the monomers forming the polymer can be any sequence in the copolymer:

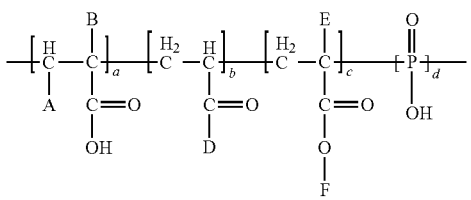

(a) A = H, B = H, CH$_3$ (or) A = COOH, B = H, CH$_3$ (b) D = ——NH——C(CH$_3$)$_2$——CH$_2$——SO$_3$M

Where M = Na, K (c) E = H, CH$_3$  F = ——(CH$_2$)$_2$——OH,

——CH$_2$——CH(CH$_3$)——OH.

Most preferably, the copolymer consists essentially of the monomeric units (a) through (d).

The monomeric units can be in any proportion. Preferably, the monomeric units (a) through (d) of a copolymer according to the invention are in the following proportions: wherein the monomeric units (a) through (d) in the copolymer are in the following proportionate ranges: (a) is in the range of 65 to 75% by weight; (b) is in the range of 10 to 15% by weight; (c) is in the range of 10 to 15% by weight; and (d) is in the range of 3 to 7% by weight.

The polymer can be synthesized by addition polymerization in bulk or in solution using suitable solvent(s). For example, the free radical copolymerization of one or more monomers containing the functional groups of carboxylic acid, sulfonic acid or salt of sulfonic acid, and hydroxyl group in the presence of a chain transfer agent that is capable providing a phosphinic acid group would provide such a copolymer. An example of a method of making such a polymer is disclosed in U.S. Pat. No. 5,077,361 issued Dec. 31, 1991, entitled "Low Molecular Weight Water Soluble Phosphinate and Phosphonate Containing Polymers," which is incorporated herein by reference in its entirety.

Monomers containing a carboxylic acid group include, for example, acrylic acid, methacrylic acid, vinyl acetic acid, itaconic acid, maleic acid, fumaric acid, and citraconic acid.

Monomers containing a sulfonic acid group include, for example, 2-acrylamido-2-methyl propane sulfonic acid, styrene sulfonic acid, and their salts.

Monomers containing a hydroxyl group include, for example, 2-hydroxyethyl methacrylate, 2-hydroxypropyl methacrylate, 2-hydroxyethyl acrylate, and 2-hydroxypropyl acrylate.

The chain transfer agent capable of providing a phosphinic acid group can be, for example, hypophosphorous acid.

Most preferably, the monomeric units (a) through (d) are acrylic acid, 2-acrylamido-2-methylpropane sulfonic acid sodium salt, 2-hydroxypropyl acrylate, and phosphinic acid, respectively.

A retarder according to this invention has been demonstrated to perform well at low temperatures (100° F. to 220° F.) as well as high temperatures (300° F. to 400° F.). The retarder is not over sensitive to concentration, especially at low temperature, which is desirable for designing cement slurry formulations in the field. For the temperature range from 220° F. to 300° F. and for greater than 400° F., a retarder intensifier can be used. An example of a retarder intensifier is a non-lignin, carboxylic acid cement retarder, which is tartaric acid.

Aqueous Phase

According to the invention, an aqueous phase can be present in the amount from about 20 to about 180 percent by weight of cement, alternatively from about 28 to about 66 percent by weight of cement, alternatively from about 36 to about 60 percent by weight of cement.

It is recognized that, in general, for water to be suitable for use in a well fluid, usually all that is required is that the water does not contain one or more materials that would be particularly detrimental to the chemistry of the cement composition or detrimental to downhole equipment or the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

Additives

Cement composition can contain additives. Such additives may include but not limited to resins, latex, stabilizers, silica, microspheres, aqueous superabsorbers, viscosifying agents, suspending agents, dispersing agents, salts, accelerants, surfactants, retardants, defoamers, high-density materials, low-density materials, fluid loss control agents, elastomers, vitrified shale, gas migration control additives, formation conditioning agents, or other additives or modifying agents, and/or combinations thereof.

Method Steps

A cement composition can be prepared at the well site, prepared at a plant or facility prior to use, or certain components can be pre-mixed prior to use and then transported to the well site. Certain components of the treatment fluid may be provided as a "dry mix" to be combined with other components prior to or during introducing into the well.

In certain embodiments, the preparation of a cement composition according to the present invention can be done at the well site in a method characterized as being performed "on the fly." The term "on-the-fly" includes methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

As used herein, introducing "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

As used herein, "into a treatment zone" means into and through the wellhead and, additionally, through the wellbore and into the treatment zone.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

In an embodiment, after the step of introducing, the method includes the step of allowing time for the cement composition to set in the well.

Preferably, after the step of allowing time for setting, the method includes a step of producing oil or gas from the well.

Pumping Time

As used herein, the "pumping time" is the total time required for pumping a hydraulic cement composition into a desired portion or zone of the well, plus a safety factor, in a cementing operation.

Thickening Time

As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc.

As used herein, the consistency of a cement composition is measured according to ANSI/API Recommended Practice 10B-2 as follows. The cement composition is mixed. The cement composition is then placed in the test cell of a High-Temperature, High-Pressure (HTHP) consistometer, such as a Fann Model 275 or a Chandler Model 8240. The cement composition is tested in the HTHP consistometer at the specified temperature and pressure. Consistency measurements are taken continuously until the consistency of the cement composition exceeds 70 Bc.

Of course, the thickening time should be greater than the designed pumping time for a cementing operation.

Setting and Compressive Strength

As used herein, the term "set" is intended to mean the process of becoming hard or solid by curing. Depending on the cement composition and conditions, it can take a few minutes to 72 hours or longer for some cement compositions to initially set. A cement composition sample that is at least initially set is suitable for destructive compressive strength testing and permeability testing. Some cement compositions can continue to develop a compressive strength greater than 50 psi over the course of several days. The compressive strength of certain kinds of cement compositions can reach over 10,000 psi.

The compressive strength of a cement composition can be used to indicate whether the cement composition has set. As used herein, a cement composition is considered "initially set" when the cement composition has developed a compressive strength of 50 psi using the non-destructive compressive strength method. As used herein, the "initial setting time" is the time between when the cement is added to the water and when the cement composition is initially set. If not otherwise stated, the setting and the initial setting time is determined at a temperature of 212° F. and a pressure of 3,000 psi.

Compressive strength is generally measured at a specified time after the cement composition has been mixed and then cured at a specified temperature and pressure. For example, compressive strength can be measured at a time in the range of about 24 to about 48 hours at a temperature of 212° F. According to ANSI/API Recommended Practice 10B-2, compressive strength can be measured by either a destructive method or non-destructive method.

The destructive method mechanically tests the strength of cement composition samples at various points in time by crushing the samples in a compression-testing machine. The destructive method is performed as follows. The cement composition is mixed. Then, the mixed composition is cured. The cured cement composition sample is placed in a compressive strength testing device, such as a Super L Universal testing machine model 602, available from Tinius Olsen, Horsham in Pa., USA. According to the destructive method, the compressive strength is calculated as the force required to break the sample divided by the smallest cross-sectional area in contact with the load-bearing plates of the compression device. The actual compressive strength is reported in units of pressure, such as pound-force per square inch (psi) or megapascals (MPa).

The non-destructive method continually measures a correlated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The cement composition is mixed. The cement composition is placed in an Ultrasonic Cement Analyzer, in which the cement composition is heated to the specified temperature and pressurized to the specified pressure. The UCA continually measures the transit time of the acoustic signal through the sample. The UCA device contains preset algorithms that correlate transit time to compressive strength. The UCA reports the compressive strength of the cement composition in units of pressure, such as psi or megapascals (MPa).

Mixing Conditions

As used herein, if any test (e.g., thickening time or compressive strength) requires mixing to form the cement composition, then the mixing step is performed according to ANSI/API Recommended Practice 10B-2 as follows. Any of the ingredients that are a dry substance are pre-blended. The liquid is added to a mixing container and the container is then placed on a mixer base. For example, the mixer can be a Lightning Mixer. The motor of the base is then turned on and maintained at about 4,000 revolutions per minute (rpm). The cement and any other pre-blended dry ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed under standard laboratory conditions (about 77° F. and about 1 atmosphere pressure).

Curing Conditions

As used herein, if any test (e.g., compressive strength) requires curing the cement composition, then the curing step is performed according to ANSI/API Recommended Practice 10B-2 as follows. After the cement composition has been mixed, the cement composition is poured into a curing mould. The curing mould is placed into a curing chamber and the curing chamber is maintained at the specified temperature and pressure for the specified time. After the specified time, the curing mould is placed into a water cooling bath at about room temperature to cool the cement composition sample.

Temperature and Pressure Conditions

It is also to be understood that if any test (e.g., thickening time or compressive strength) specifies that a step of the test be performed at a specified temperature and a specified pressure, then after being mixed under Standard Laboratory Conditions, the temperature and pressure of the cement composition is ramped up to the specified temperature and pressure. For example, the cement composition can be mixed at 77° F. and then placed into the testing apparatus and the temperature of the cement composition can be ramped up to the specified temperature. As used herein, the rate of ramping up the temperature is in the range of about 3° F./min to about 5° F./min. After the cement composition is ramped up to the specified temperature and pressure, the cement composition is maintained at that temperature and pressure for the specified duration.

EXAMPLES

To facilitate a better understanding of the present invention, the following examples of certain aspects of some embodiments are given. In no way should the following examples be read to limit, or define, the entire scope of the invention.

The effect of copolymer as described herein on cement slurry was investigated. A copolymer comprising acrylic acid, 2-acrylamido-2-methylpropane sulfonic acid sodium salt, 2-hydroxypropyl acrylate, and phosphinic acid was tested at various concentration and temperature. The copolymer is an aqueous solution containing 35.1% solid. The structure and composition of the copolymer is given below.

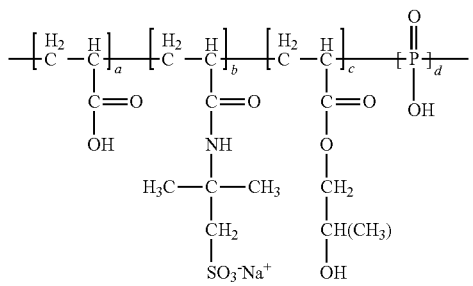

The monomeric units of this tested copolymer are in the following proportions: (a)=65-75%, (b)=10-15%, (c)=10-15%, d=3-7% by weight.

A cement composition was prepared of this copolymer as retarder, 100 wt. % class H cement, 46.5 wt. % water, 35 wt. % coarse silica flour as a strength retrogression preventive additive, and 0.5 wt. % sulfonic acid copolymer as a fluid loss control additive. These weight percentages given are by weight of cement ("BWOC").

TABLE 1

Composition of the cement slurry (Density: 16.58 ppg)

| Materials | Amount (%) |
|---|---|
| Water | 46.5 |
| Class H Cement | 100 |
| Silica Flour | 35 |
| Fluid loss additive | 0.5 |

The thickening times of the cement slurry as a function of temperature and the concentration of copolymer was determined. These results are presented in Table 2. The results at temperatures 120° F. and 217° F. are plotted in the charts of FIG. 1 and FIG. 2.

TABLE 2

Effect of copolymer concentration on thickening time

| Temperature (° F.) | Copolymer Concentration (%) | Thickening time (HR:MM) |
|---|---|---|
| 100 | 0.08 | 3:45 |
| 120 | 0.08 | 3:19 |
|  | 0.12 | 5:41 |
|  | 0.16 | 7:40 |
| 150 | 0.13 | 4:22 |
| 180 | 0.26 | 6:11 |
| 217 | 0.26 | 2:56 |
|  | 0.39 | 7:43 |
|  | 0.52 | 9:47 |
| 270 | 0.52* | 3:38 |
| 330 | 0.9 | 6:20 |
|  | 1.3 | 8:18 |
| 360 | 1.8 | 4:53 |

*0.5% tartaric acid

TABLE 3

Compressive strength of slurry with retarder

| Retarder (%) | Thickening Time (HR:MM) | Time for 50 psi (HR:MM) | Time for 500 psi (HR:MM) | 24 hrs compressive strength (psi) |
|---|---|---|---|---|
| 0.26 | 2:56 | 8:36 | 9:30 | 3261 |
| 0.52 | 9:47 | 15:12 | 17:36 | 2349 |

TABLE 4

Rheology of the slurry

| | Fann 35 Viscometer Reading (at 75° F.) | | | | | |
|---|---|---|---|---|---|---|
| Retarder (%) | 3 | 6 | 100 | 200 | 300 | 600 |
| 0 | 2 | 6 | 73 | 133 | 187 | 300+ |
| 0.26 | 2 | 4 | 54 | 97 | 178 | 255 |

CONCLUSION

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of composition or steps, other than as described in the claims.

What is claimed is:

1. A method of cementing in a well, the method comprising the steps of:
(A) introducing a cement composition into the well, the cement composition comprising:
(i) a hydraulic cement;
(ii) a copolymer comprising at least the monomeric units (a) through (d) of the following formula:

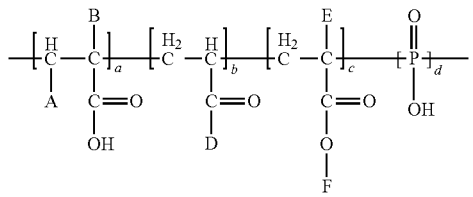

wherein (a) A = H, B = H, $CH_3$ (or) A = COOH, B = H, $CH_3$ (b) D = —NH—C$(CH_3)_2$—$CH_2$—$SO_3$M Where M = Na, K (c) E = H, $CH_3$  F = —$(CH_2)_2$—OH,
—$CH_2$—CH$(CH_3)$—OH wherein the monomeric units (a) through (d) can be in any sequence in the copolymer; and
(iii) water; and
(B) allowing the cement composition to set in the well.

2. The method according to claim 1, wherein the hydraulic cement is a cementitious material selected from the group consisting of Portland cements, pozzolanic cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, or combinations thereof.

3. The method according to claim 1, wherein the monomeric units (a) through (d) are acrylic acid, 2-acrylamido-2-methylpropane sulfonic acid sodium salt, 2-hydroxypropyl acrylate, and phosphinic acid, respectively.

4. The method according to claim 1, wherein the monomeric units (a) through (d) in the copolymer are in the following ranges:
(a) is in the range of 65 to 75% by weight;
(b) is in the range of 10 to 15% by weight;
(c) is in the range of 10 to 15% by weight; and
(d) is in the range of 3 to 7% by weight.

5. The method according to claim 1, wherein the concentration of the copolymer is between 0.05% by weight of the cement and 3% by weight of the cement.

6. The method according to claim 1, wherein the cement composition further comprises silica flour.

7. The method according to claim 1, further comprising a fluid-loss control additive.

8. The method according to claim 7, wherein the fluid-loss control additive is selected from the group consisting of: sulfonic acid copolymer, acrylamide copolymers, cellulosic polymers and derivatives thereof, and modified cellulosic polymers.

9. The method according to claim 1, further comprising a retarder intensifier.

10. The method according to claim 9, wherein the retarder intensifier is tartaric acid.

11. The method according to claim 10, wherein the composition has a thickening time of at least 2 hours at any temperature between 100° F. and 360° F.

12. A method of cementing in a well, the method comprising the steps of:
(A) introducing a cement composition into the well, the cement composition comprising:
(i) a hydraulic cement;
(ii) a copolymer comprising at least the monomeric units (a) through (d) of the following formula:

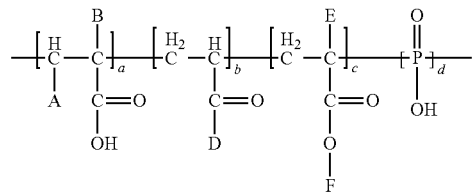

wherein (a) A = H, B = H, $CH_3$ (or) A = COOH, B = H, $CH_3$ (b) D = —NH—C$(CH_3)_2$—$CH_2$—$SO_3$M Where M = Na, K (c) E = H, $CH_3$  F = —$(CH_2)_2$—OH,
—$CH_2$—CH$(CH_3)$—OH wherein the monomeric units (a) through (d) can be in any sequence in the copolymer, and
wherein the monomeric units (a) through (d) in the copolymer are in the following ranges:
(a) is in the range of 65 to 75% by weight;
(b) is in the range of 10 to 15% by weight;
(c) is in the range of 10 to 15% by weight;
(d) is in the range of 3 to 7% by weight; and
(iii) water; and
(B) allowing the cement composition to set in the well.

* * * * *